(12) United States Patent
Feng et al.

(10) Patent No.: US 11,881,903 B2
(45) Date of Patent: Jan. 23, 2024

(54) ANTENNA CALIBRATION USING FOUNTAIN CODED SEQUENCE

(71) Applicant: Telefonaktiebolaget LM Ericsson (publ), Stockholm (SE)

(72) Inventors: Ang Feng, Stockholm (SE); Qingzhi Feng, Kungsängen (SE); Jichang Liao, Sollentuna (SE); Yanhui Zhao, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/796,277

(22) PCT Filed: Jan. 30, 2020

(86) PCT No.: PCT/IB2020/050761
§ 371 (c)(1),
(2) Date: Jul. 29, 2022

(87) PCT Pub. No.: WO2021/152348
PCT Pub. Date: Aug. 5, 2021

(65) Prior Publication Data
US 2023/0085748 A1 Mar. 23, 2023

(51) Int. Cl.
*H04B 17/12* (2015.01)
(52) U.S. Cl.
CPC .................... *H04B 17/12* (2015.01)
(58) Field of Classification Search
CPC ....................................... H04B 17/12
See application file for complete search history.

(56) References Cited

U.S. PATENT DOCUMENTS

2002/0171583 A1 * 11/2002 Purdy .................... H01Q 25/00
342/368
2004/0214604 A1 10/2004 Yoon et al.
(Continued)

FOREIGN PATENT DOCUMENTS

WO WO-2018024055 A1 * 2/2018 ............ H04W 48/08

OTHER PUBLICATIONS

International Search Report and Written Opinion of the International Searching Authority, PCT/IB2020/050761, dated Oct. 12, 2020, 10 pages.
(Continued)

*Primary Examiner* — Hsinchun Liao
(74) *Attorney, Agent, or Firm* — Sage Patent Group

(57) ABSTRACT

A method of calibrating an antenna array in a wireless network node is disclosed, the wireless network node including a plurality of antenna branches, each of the plurality of antenna branches including a respective antenna element. The method includes repeating operations of transmitting a slice of a fountain coded sequence through the plurality of antenna branches to the respective antenna elements, and for each antenna branch of the plurality of antenna branches, selecting the transmitted slice as a feedback signal through a return path and determining a signal quality of the feedback signal, until the signal quality of the feedback signal for each antenna branch is greater than a threshold level. The method further includes performing antenna calibration based on the feedback signal for each antenna branch. Related devices, computer programs and computer program products are disclosed.

20 Claims, 6 Drawing Sheets

(56) References Cited

U.S. PATENT DOCUMENTS

| | | | | |
|---|---|---|---|---|
| 2005/0239419 A1* | 10/2005 | Fudaba | ................. | H04B 17/19 |
| | | | | 455/562.1 |
| 2011/0045865 A1* | 2/2011 | Viering | ............... | H04W 52/325 |
| | | | | 455/522 |
| 2012/0246538 A1 | 9/2012 | Wu et al. | | |

OTHER PUBLICATIONS

Bertenyi et al., "5G NR Radio Interface," Journal of ICT Standardization, vol. 6, No. 1, pp. 31-58, May 2018.
Bjornson et al., "Massive MIMO: ten myths and one critical question," IEEE Communications Magazine, vol. 54, No. 2, pp. 114-123, Feb. 2016.
Vieira et al., "Reciprocity Calibration for Massive MIMO: Proposal, Modeling, and Validation," IEEE Transactions on Wireless Communications, vol. 16, No. 5, pp. 3042-3056, May 2017.
Mackay, "Fountain codes," IEE Proceedings—Communications, vol. 152, No. 6, pp. 1062-1068, Dec. 2005.
Pauluzzi et al., "A comparison of SNR estimation techniques for the AWGN channel," IEEE Transactions on Communications, vol. 48, No. 10, pp. 1681-1691, Oct. 2000.

* cited by examiner

ANTENNA CALIBRATION USING FOUNTAIN CODED SEQUENCE

CROSS REFERENCE TO RELATED APPLICATIONS

This application is a 35 U.S.C. § 371 national stage application of PCT International Application No. PCT/IB2020/050761 filed on Jan. 30, 2020, the disclosure and content of which is incorporated by reference herein in its entirety.

TECHNICAL FIELD

The present disclosure relates to wireless communications systems, and in particular to antenna calibration systems/methods in multi-antenna communication devices.

BACKGROUND

The 5G wireless standard includes support for massive multi-input multi-output (MIMO) antenna systems in wireless network nodes, such as base stations and wireless devices. Massive MIMO provides advantages for wireless communications due to increased spectral efficiency and energy efficiency.

The Active Antenna System (AAS) is an implementation of massive MIMO that integrates an RF transceiver and antenna together to achieve a compact size. AAS utilizes an antenna array with beamforming to implement multi-user MIMO (MU-MIMO) to boost throughput or enlarge coverage. Beamforming is accomplished by calculating and applying complex weights to signals that are radiated over a plurality of different antennas. The weights are selected to cause the signals transmitted by the different antennas to combine in predetermined locations or directions, resulting in selectively increased or decreased signal gain at selected locations or directions.

To obtain the full benefit of using an AAS, e.g., to ensure that functions such as beam steering and/or side lobe cancellation are being performed properly by the system, it is desirable to carefully calibrate the antenna array and RF chains in the system. Due to manufacturing tolerances, it is difficult to determine the appropriate complex weights to use without having correct knowledge of the condition of the channel between the transmitter and the antenna. Moreover, the condition of the channel between the transmitter and the antenna can change with time, such as, for example, as a result of temperature change over time or parameter drift.

The accuracy and robustness of antenna calibration directly impact performance of a system that uses AAS. For that reason, Antenna Calibration (AC) may be performed to enhance the effectiveness of AAS. In generally, AC includes both uplink AC and downlink AC. For downlink AC, a transmitter (TX) chain may be configured to transmit signals to an Antenna Interface Transceiver (AI-TRX) that are modulated in different domains, such as the time domain, frequency domain or code domain. Since code domain multiplexing (CDM) requires fewer calibration resources (in terms of time and frequency) and may provide somewhat better coding gains, it is more popular than other approaches.

SUMMARY

Conventional antenna calibration systems/methods may suffer from low signal to noise ratio in the calibration feedback signal, which can reduce the efficiency and/or effectiveness of antenna calibration. Moreover, a low SNR of the feedback signal may cause AC to restart, further reducing the efficiency of AC.

Some embodiments described herein use a Fountain coded sequence to generate a calibration signal. In some embodiments, this approach may provide increased coding gain, improved robustness to low SNR, and/or enhanced calibration efficiency. Some embodiments may utilize low complexity zero-forcing (ZF) or minimum mean square error (MMSE) decoding. Moreover, some embodiments may realize powers saving within an AC accuracy constraint.

Some embodiments provide a method of calibrating an antenna array in a wireless network node (100) including a plurality of antenna branches (110), each of the plurality of antenna branches including a respective antenna element (130). The method includes repeating operations of transmitting (508) a slice of a fountain coded sequence through the plurality of antenna branches to the respective antenna elements, and, for each antenna branch of the plurality of antenna branches, selecting (516) the transmitted slice as a feedback signal through a return path (214) and determining (520) a signal quality of the feedback signal, until the signal quality of the feedback signal for each antenna branch is greater than a threshold level. The method further includes performing (512) antenna calibration based on the feedback signal for each antenna branch.

In some embodiments, transmitting the slice of the fountain coded sequence comprises transmitting sequential slices of the fountain coded sequence until a matrix GG* formed by a generation matrix G is non-singular, where the generation matrix G comprises an N×M matrix comprising elements $c_{n,m}$, N denotes a number of antenna branches of the plurality of antenna branches, M denotes a number of received symbols of the fountain coded sequence, m denotes the mth symbol of the fountain coded sequence on an antenna branch n of the N number of branches of the plurality of antenna branches.

In some embodiments, the method further includes generating the fountain coded sequence, slicing the fountain coded sequence to obtain the slice of the fountain coded sequence, wherein the slice of the fountain coded sequence comprises at least one symbol of the fountain coded sequence, adding a cyclic prefix to the at least one symbol of the fountain coded sequence, and inserting the slice of the fountain coded symbol into a downlink signal for transmission.

In some embodiments, the elements $c_{n,m}$ comprise a spreading code, and wherein generating the fountain coded sequence comprises spreading the at least one symbol using the spreading code $c_{n,m}$.

In some embodiments, generating the fountain coded sequence comprises generating a symbol of length N and repeating the symbol to obtain a sequence of length $N_{seq} > N$.

In some embodiments, generating the fountain coded sequence comprises generating the symbol for branch n according to the following equation:

$$c_{n,i} = \exp\left(-j\frac{\pi u i(i+2q)}{N}\right), i = 0, \ldots, N-1$$

where u and q denote parameters of a Zadoff-Chu sequence.

In some embodiments, generating the fountain coded sequence comprises generating a Zadoff-Chu sequence of length $N_{seq}$ according to the following equation:

$$c_{n,m} = \exp\left(-j\frac{\pi u_n m(m + 2q)}{N_{seq}}\right), m = 0, \ldots, N_{seq} - 1$$

where $u_n$ is a root of the Zadoff-Chu sequence for branch n, and q denotes a parameter of the Zadoff-Chu sequence.

In some embodiments, determining the signal quality of the feedback signal comprises determining a signal to noise ratio, SNR, of the feedback signal.

In some embodiments, determining the signal to noise ratio of the feedback signal comprises performing blind SNR estimation.

In some embodiments, performing blind estimation comprises determining SNR according to the following formula:

$$\rho = \frac{\sqrt{2M_2^2 - M_4}}{M_2 - \sqrt{2M_2^2 - M_4}}$$

where $\rho$ is the SNR, $$M_2 = \frac{1}{N_{fft}}\sum_{j=0}^{N_{fft}-1}|\tilde{S}_n(j)|^2, M_4 = \frac{1}{N_{fft}}\sum_{j=0}^{N_{fft}-1}|\tilde{S}_n(j)|^4,$$

$\tilde{S}_n(j)$ is the jth element of $\tilde{S}_n$, $\tilde{S}_n$ is an estimated value of the symbol of the fountain coded sequence at the nth antenna branch, and $N_{fft}$ is a size of a Fast Fourier Transform matrix used to generate the symbol.

In some embodiments, the method further includes estimating the fountain coded sequence from the feedback signal using a zero forcing receiver or a minimum mean square error receiver.

In some embodiments, estimating the fountain coded sequence from the feedback signal using a zero forcing receiver comprises estimating the fountain coded sequence according to the formula:

$$[\tilde{s}_0, \tilde{s}_1, \ldots, \tilde{s}_{N-1}] = [r_0, r_1, \ldots, r_m]G^*(GG^*)^{-1}$$

where $r_m$ denotes an mth element of the received signal, G denotes a generation matrix that comprises a matrix comprising elements $c_{n,m}$, where N denotes a number of antenna branches of the plurality of antenna branches, M denotes a number of received symbols of the fountain coded sequence, m denotes the mth symbol of the fountain coded sequence on branch n of the N number of branches of the plurality of antenna branches, and $\tilde{s}_n$ denotes an estimated value of the mth symbol of the fountain coded sequence on branch n.

In some embodiments, estimating the fountain coded sequence from the feedback signal using a minimum mean square error receiver comprises estimating the fountain coded sequence according to the formula:

$$[\tilde{s}_0, \tilde{s}_1, \ldots, \tilde{s}_{N-1}] = [r_0, r_1, \ldots, r_m]G^*(GG^* + 1/\rho)^{-1}$$

where $r_m$ denotes an mth element of the received signal, G denotes a generation matrix that comprises an N×M matrix comprising elements $c_{n,m}$, N denotes a number of antenna branches of the plurality of antenna branches, M denotes a number of received symbols of the fountain coded sequence, m denotes the mth symbol of the fountain coded sequence on branch n of the N number of branches of the plurality of antenna branches, $\tilde{s}_n$ denotes an estimated value of the mth symbol of the fountain coded sequence on branch n, and $\rho$ is signal-to-noise ratio (SNR).

In some embodiments, the fountain coded sequence comprises a plurality of symbols generated by orthogonal frequency division multiplexing.

A network node (100) according to some embodiments includes a processor circuitry (106), a wireless transceiver (120) coupled to the processor circuit, and a memory (108) coupled to the processor circuit, the memory comprising machine readable program instructions that, when executed by the processor circuit, cause the network node to perform operations that include repeating operations of transmitting (508) a slice of a fountain coded sequence through the plurality of antenna branches to the respective antenna elements, and, for each antenna branch of the plurality of antenna branches, selecting (516) the transmitted slice as a feedback signal through a return path (214), and determining (520) a signal quality of the feedback signal, until the signal quality of the feedback signal for each antenna branch is greater than a threshold level, and performing (512) antenna calibration based on the feedback signal for each antenna branch.

A computer program comprising program code to be executed by processing circuitry (106) of a network node (100) configured to operate in a communication network, whereby execution of the program code causes the network node (100) to perform operations that include repeating operations of transmitting (508) a slice of a fountain coded sequence through the plurality of antenna branches to the respective antenna elements, and, for each antenna branch of the plurality of antenna branches, selecting (516) the transmitted slice as a feedback signal through a return path (214), and determining (520) a signal quality of the feedback signal, until the signal quality of the feedback signal for each antenna branch is greater than a threshold level, and performing (512) antenna calibration based on the feedback signal for each antenna branch.

A computer program product comprising a non-transitory storage medium including program code to be executed by processing circuitry (106) of a network node (100) configured to operate in a communication network, whereby execution of the program code causes the network node (100) to perform operations that include repeating operations of transmitting (508) a slice of a fountain coded sequence through the plurality of antenna branches to the respective antenna elements, and, for each antenna branch of the plurality of antenna branches, selecting (516) the transmitted slice as a feedback signal through a return path (214), and determining (520) a signal quality of the feedback signal, until the signal quality of the feedback signal for each antenna branch is greater than a threshold level, and performing (512) antenna calibration based on the feedback signal for each antenna branch.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1A:
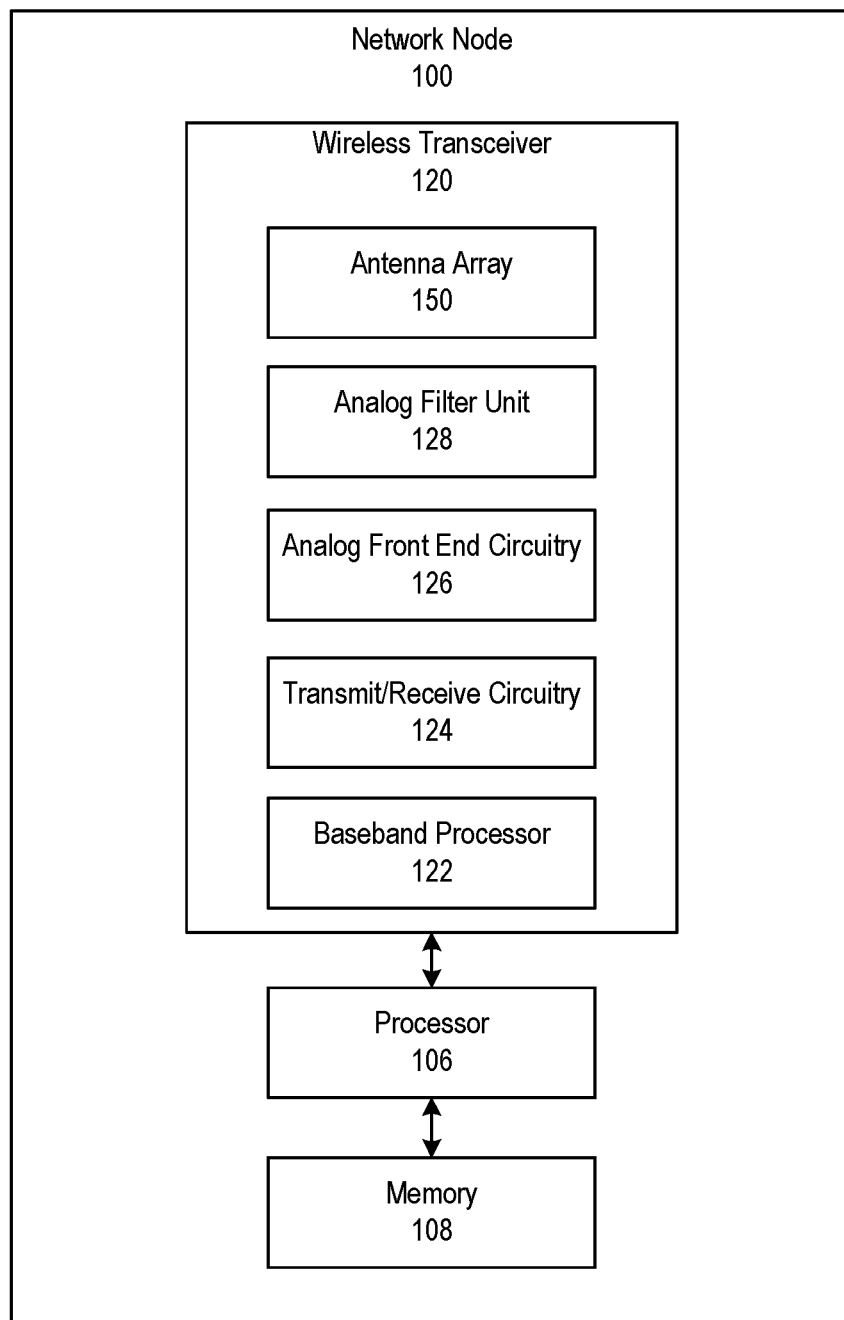
FIG. 1A is a block diagram of a network node of a wireless communication system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Antenna calibration (AC) is performed to enhance the coherence of an active antenna system. Downlink (DL) AC is performed by transmitting calibration signals and feeding the transmitted signals back as feedback signals for analysis. Generally, downlink AC is performed by transmitting calibration signals in normal downlink slot. Transmitting at other times, such as transmitting during guard periods (GP), may cause DL AC to fail the 3GPP requirement of "TX OFF" during that time.

When transmitting calibration signals in a normal DL slot, DL AC has to stop DL traffic and insert a calibration signal sequence into the downlink signal. With proper scheduling in baseband, the impact to DL traffic can be reduced, but cannot be removed completely. Although CDM is more efficient than other modulation techniques, a typical CDM-based sequence does not have sufficient coding gain to handle a very low signal to noise ratio (SNR). Moreover, a CDM-based sequence may be easily corrupted. That is, if the code does not contain a complete sequence, orthogonality might be lost, and the calibration process may have to be restarted.

An incomplete calibration sequence can be indicated by a low SNR of the feedback signal. There are many functionalities in AAS that could cause low SNR, such as a link error, or control word missing, or wrong TDD switching, or power backoff/off in high temperature, etc. Restarting AC may not be desirable because it may be difficult for the system to recover from the error within a short time.

SNR can be increased by changing the link budget of the transmitter. However, transmitter output power may have strict constraints to avoid causing interference to neighboring infrastructure. It may not be desirable to change the AC link budget for part of the transmit signal. Accordingly, it is desirable to for the calibration signal to have higher coding gain and/or more robustness to low SNR. It would also be desirable for an AC system to be able to accommodate to dynamic traffic with flexible lengths. Furthermore, it is desirable for the AC system to have low complexity for easy implementation.

Some embodiments described herein provide antenna calibration systems/methods that use a Fountain coded sequence to generate a calibration signal. Firstly, a long CDM sequence is generated using a Fountain code. Because a Fountain code is used to generate the calibration signal, the coding gain of the signal increases as more symbols are received. Moreover, because a Fountain code is used, the code can be decoded even if some slices are missed due to low SNR. Secondly, the sequence may be divided into several slices to accommodate vacant symbols. In some embodiments, the sequence may be extended to provide higher coding gain. Finally, some embodiments utilize recursive decoding to reduce complexity.

Although antenna calibration systems/methods are described herein in the context of downlink AC, the systems/methods described herein can be also be applied to uplink AC, which is generally not as complex as downlink AC.

Figure 1B:
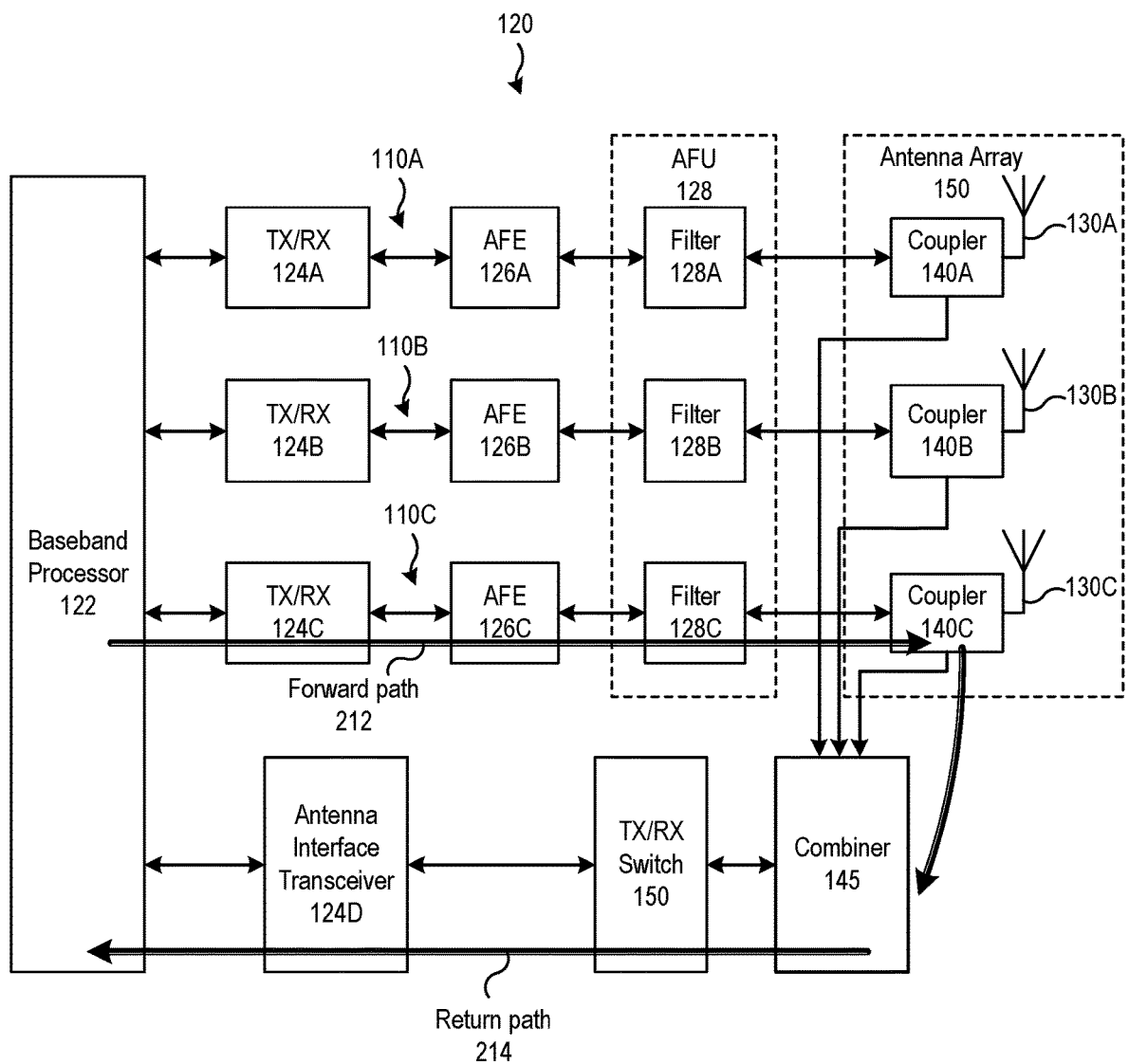
FIG. 1B is a block diagram that illustrates a transceiver of a network node of a wireless communication system including an antenna array.

FIG. 1A is a block diagram of an exemplary network node 100 of a wireless communication system in accordance with some embodiments, and FIG. 1B is a block diagram that illustrates an exemplary transceiver 120 of a network node 100 including an antenna array 150 in accordance with some embodiments.

Referring to FIG. 1A, a network node 100 of a wireless communication system includes a wireless transceiver 120 configured to provide communications with other wireless devices over a communication network, a processor circuit 106 coupled to the wireless transceiver 120, and a memory 108 coupled to the processor circuit 106. The memory 108 may include computer readable program code that when executed by the processor circuit 106 causes the processor circuit 106 to perform operations according to embodiments disclosed herein. In other embodiments, the processor circuit 106 may be defined to include memory so that a memory 108 may not separately provided.

The wireless transceiver 120 includes various subsystems that collectively operate to transmit/receive wireless signals over an air interface. In particular, the wireless transceiver 120 includes a baseband processor 122, a transmit/receive circuitry 124, an analog front end (AFE) circuitry 126, an analog filter unit 128 and an antenna array 150.

Referring to FIG. 1B, elements of the wireless transceiver 120 are illustrated in more detail. As shown therein, the antenna array 150 includes a plurality of antenna elements 130A-C that are fed by a respective plurality of antenna branches 110A-C that are coupled between the antenna elements 130A-C and the baseband processor 122. Each antenna branch 110A-C includes a plurality of elements including a transmit/receive circuit 124A-C, an analog front end 126A-C and an analog filter 128A-C. Each of the antenna branches 110A-C forms a forward path from the baseband processor 122 to a respective antenna element 130A-C. Accordingly, antenna calibration signals generated by the baseband processor 122 are transmitted to the antenna elements 130A-C on the forward path 212 via respective antenna branches 110A-C. Although three antenna branches 110A-C and antenna elements 130A-C are illustrated in FIG. 1B, it will be appreciated that a system according to some embodiments may include more than three antenna branches and associated antenna elements.

The wireless transceiver 120 further includes a return path 214 coupled to each of the antenna elements 130A-C by a respective coupler 140A-C and a combiner 145 which combines signals from the couplers 140A-C. Antenna calibration signals received by the combiner 145 from the couplers 140A-C are passed though a TX/RX switch 150 and an antenna interface transceiver 124D to the baseband processor 122.

In an antenna calibration (AC) process, calibration signals transmitted to the antenna elements 130A-C over the forward path are fed back to the baseband 122 over the return path 214 as feedback signals. The baseband processor 122 analyzes the feedback signals to determine channel characteristics of each of the antenna branches 110A-C. The channel characteristics of the antenna branches 110A-C are used by the baseband processor 122 to adjust the antenna weights applied to signals transmitted on the antenna branches 110A-C to improve performance of the active antenna system.

According to some embodiments, the calibration signals are generated using a Fountain code. Fountain codes (also known as rateless erasure codes) represent a class of erasure codes. An erasure code is a forward error correction (FEC) code that is used in situations in which bit erasures are more likely to occur than bit errors. In general, an erasure code transforms a message of k symbols into a longer message (code word) with n symbols such that the original message can be recovered from a subset of the n symbols.

Fountain codes are capable of generating a potentially limitless sequence of encoding symbols from a given set of source symbols, such that the original source symbols can ideally be recovered from any subset of the encoding symbols of size at least equal to the number of source symbols. The term "Fountain" or "rateless" refers to the fact that, unlike a typical erasure code, Fountain codes do not exhibit a fixed code rate.

Figure 2:
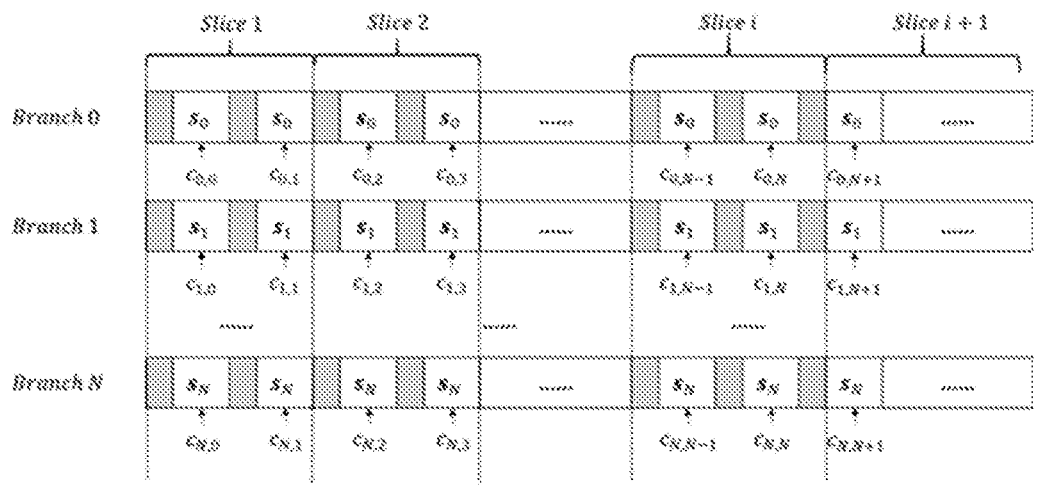
FIG. 2 illustrates transmission of a calibration sequence over a plurality of antenna branches of a transceiver of a network node of a wireless communication system.

FIG. 2 illustrates CDM signal generation according to some embodiments, where $s_n$, n=0, . . . , N−1 denotes an Orthogonal Frequency-Domain Multiplexing (OFDM) symbol for antenna branch n, where N denotes a number of antenna branches of the plurality of antenna branches. One OFDM symbol is composed of $N_{fft}$ samples, which can be expressed as:

$$s_n = F * S_n \quad [1]$$

where F is a Fourier matrix with dimension of $N_{fft} \times N_{fft}$, and $S_n$ is the vector for branch n to collect all modulation symbols at active bins. The number of active bins is determined by bandwidth and subcarrier spacing. For different branches (n≠n'), and thus $S_n$ and $S_{n'}$ can be either different or the same. However, it would be better if mutual uncorrelated symbols are used for different branches to reduce the Peak-to-Average Ratio (PAR) of the combined signal. Without loss of generality, the value of active bins would be constant modulus sequences, such as Zadoff-Chu or Gold sequences. This assumption facilitates the SNR estimation employed at the receiver side.

To avoid inter-symbol-interference (ISI) and force linear convolution to cyclic convolution, additional $N_{cp}$ samples are added as a cyclic prefix (CP) to each OFDM symbol, shown as shaded blocks in FIG. 2. The length of the CP should be greater than the maximum delay introduced by the filters 128A in the TX chains shown in FIG. 1B.

The OFDM symbols are multiplied with spreading code as shown in Eq. 2:

$$[x_{n,0}, x_{n,1}, \ldots, x_{n,m}] = [c_{n,0}s_n, c_{n,1}s_n, \ldots, c_{n,m}s_n] \quad [2]$$

where $x_{n,m}$ denotes the mth symbol of branch n, and m≥N. $c_{n,m}$ denotes one chip (a real or complex number) for the mth symbol of branch n.

After transmitting the spread symbols $x_{n,m}$ to the antenna array 130, the signals are combined at combiner 145 and fed back to antenna interface transceiver (AI-TRX) 124D, as shown in FIG. 1B. The received signal is expressed as shown in Eq. 3:

$$r_m = \sum_{n=0}^{N-1} h_n \odot x_{n,m} + w_m \quad [3]$$

where $w_m$ is additive white Gaussian noise (AWGN), and $h_n$ is the channel response of branch n. The operator $\odot$ denotes the circular convolution between two vectors. Summing all steps, the received signal can thus be expressed as in Eq. [4]:

$$[r_0, r_1, \ldots, r_m] = [s_0', s_1', \ldots, s_{N-1}']$$
$$G + [w_0, w_1, \ldots, w_m] \quad [4]$$

where the generation matrix is given by Eq. 5 as:

$$G \triangleq \begin{bmatrix} c_{0,0} & c_{0,1} & \cdots & c_{0,m-1} & c_{0,m} \\ c_{1,0} & c_{1,1} & & c_{1,m-1} & c_{1,m} \\ \vdots & & \ddots & & \vdots \\ c_{N-1,0} & c_{N-1,1} & \cdots & c_{N-1,m-1} & c_{N-1,m} \\ c_{N,0} & c_{N,1} & & c_{N,m-1} & c_{N,m} \end{bmatrix} \quad [5]$$

The signal $s_n'$ consists of the calibration signal and the channel response, i.e.:

$$s_n' = h_n \odot s_n \quad [6]$$

Figure 3:
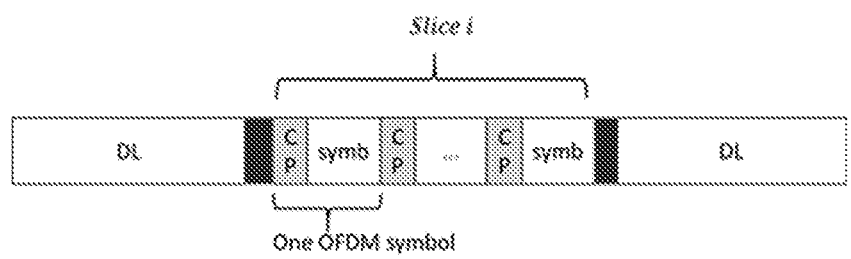
FIG. 3 illustrates a format of a slice of a calibration sequence.

The signal $[x_{n,0}, x_{n,1}, \ldots, x_{n,m}]$ for branch n can be divided into several slices with different sizes. FIG. 3 illustrates the insertion of one slice into DL traffic data. The darker blocks indicate the margin between AC symbols and DL traffic data. The size of each slice depends on the number of vacant symbols that baseband can provide. This method facilitates the baseband scheduling and provides increased flexibility to dynamic traffic.

Assuming no symbols are discarded due to low SNR and that the matrix G is full rank, the receiver can utilize a technique such as Zero-forcing (ZF) or Minimum Mean-Squared Error (MMSE) to recover $s_n$. ZF receiving may be performed according to Eq. 7a and MMSE receiving may be performed according to Eq. 7b:

$$[\tilde{s}_0, \tilde{s}_1, \ldots, \tilde{s}_{N-1}] = [r_0, r_1, \ldots, r_m] G^*(GG^*)^{-1} \quad [7a]$$

$$[\tilde{s}_0, \tilde{s}_1, \ldots, \tilde{s}_{N-1}] = [r_0, r_1, \ldots, r_m] G^*(GG^* + 1/\rho)^{-1} [7b]$$

where, $\tilde{s}_n$ is the estimation of $s_n'$, and $\rho$ is signal-to-noise ratio (SNR).

Note that the complexity of $(GG^*)^{-1}$ or $(GG^* + 1/\rho)^{-1}$ is $O(N^3)$, which may be prohibitive if N is large. Some embodiments provide a recursive algorithm for performing fast decoding. An exemplary recursive algorithm is described below with respect to ZF receiving. However, it can be extended to MMSE directly.

Suppose G is composed of two parts, i.e. $G = [G_A \; G_B]$, where $G_A$ denotes the past received symbols, and $G_B$ is new received symbols, as in Eq. [8]:

$$(GG^*)^{-1} = (G_A G_A^* + G_B G_B^*)^{-1} = (G_A G_A^*)^{-1} - (G_A G_A^*)^{-1} G_B (G_B^* (G_A G_A^*)^{-1} G_B)^{-1} G_B^* (G_A G_A^*)^{-1} \quad [8]$$

Since $(G_A G_A^*)^{-1}$ is already calculated in the previous step, and $(G_B^*(G_A G_A^*)^{-1} G_B)^{-1}$ has a very low dimension (it might be scalar division in case only one symbol is added), the complexity of Eq. 8 is only $O(N^2)$. Furthermore, if $G_A$ is an orthogonal matrix, the computation can be simplified to the form shown in Eq. [9]:

$$(GG^*)^{-1} = I - G_B(G_B^* G_B)^{-1} G_B^* \quad [9]$$

If a set of orthogonal sequences are included in the spreading code, the recursive algorithm can start after orthogonal sequences have been collected, thereby significantly reducing the complexity.

Figure 4:
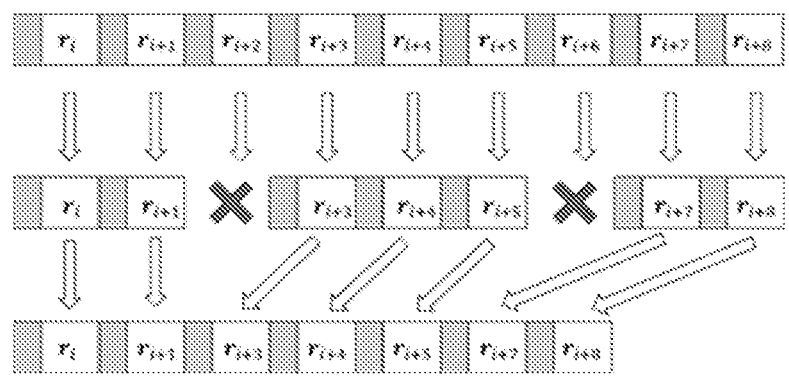
FIG. 4 illustrates loss of calibration data in an antenna calibration system.

As noted above, a Fountain code is a rateless code with a potentially infinite code length. In this case, it is assumed that m=∞. In every AC event, a new slice of Fountain coded symbols is added. The SNR at the receiver side is increased as more symbols are received. In addition to boosting the SNR (or better AC accuracy explicitly), the use of a Fountain code provides the ability to recover the symbols even if some symbols are lost due to low SNR. FIG. 4 shows an example of this case, where symbol $r_{i+2}$ and symbol $r_{i+6}$ are not received. The use of a Fountain coded sequence ensures that AC can still survive an occasional loss of data without having to be re-started.

The process of receiving calibration and processing calibration symbols at the baseband processor 122 can be described as follows.

First, if new symbols are not received at the antenna interface transceiver 124D, the, the baseband processor 122 will not update SNR estimation and will wait for the next AC event.

Second, if newly received symbols only include noise, the receiver will discard the new symbols and wait for the next AC event.

Once all antenna branches 110A-C have achieved a sufficiently good SNR to enable functioning of the AC algorithm, the process of transmitting and receiving calibration symbols is terminated, and the baseband processor 122 will proceed to execute the AC algorithm based on the received calibration symbols.

SNR estimation is an important factor in determining when the AC algorithm can be successfully executed. Current SNR estimation requires delay/phase alignment, which is implemented in the AC algorithm. To avoid replicating the process in the AC algorithm, some embodiments perform blind SNR estimation. Considering the modulation symbols at active bins are constant modulus, and $\tilde{S}_n = F\tilde{s}_n$, the kurtosis SNR estimation can be expressed as shown in Eq. 10:

$$\rho = \frac{\sqrt{2M_2^2 - M_4}}{M_2 - \sqrt{2M_2^2 - M_4}} \quad [10]$$

where, $$M_2 = \frac{1}{N_{fft}} \sum_{j=0}^{N_{fft}-1} |\tilde{S}_n(j)|^2, \quad M_4 = \frac{1}{N_{fft}} \sum_{j=0}^{N_{fft}-1} |\tilde{S}_n(j)|^4,$$

and $\tilde{S}_n(j)$ is the jth element of $\tilde{S}_n$.

Operations of systems/methods according to some embodiments will now be described with respect to the flowcharts of FIGS. 5A and 5B. The operations described with respect to Figures 5A and 5B can be performed by one or more devices, such as the devices in illustrated in FIGS. 1A and 1B.

Figure 5A:
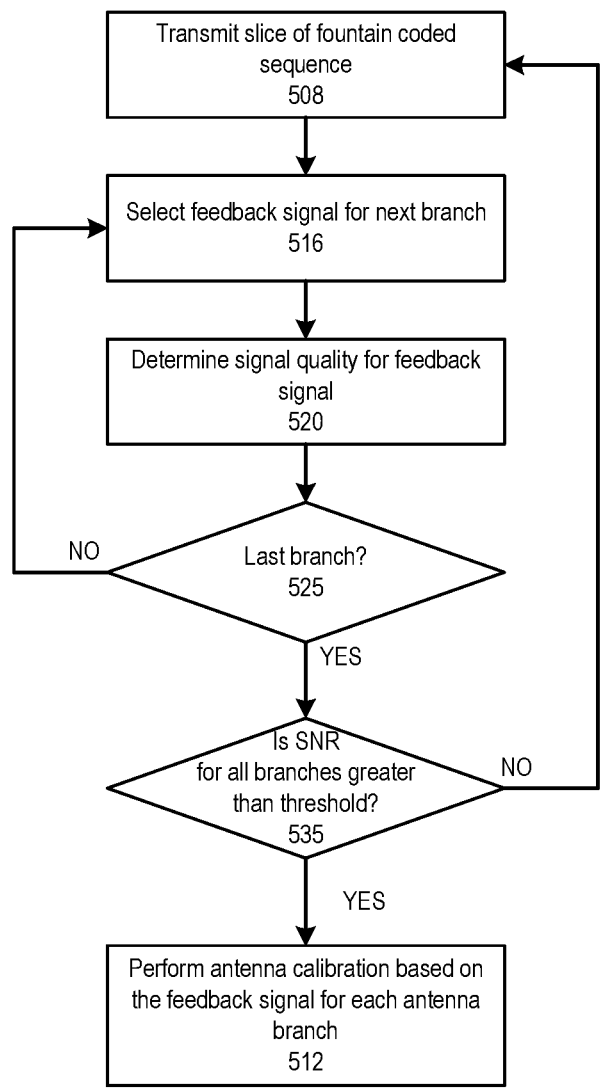
FIGS. 5A and 5B are flowcharts that illustrates operations of systems/methods according to some embodiments.

Simplified operations of systems/methods according to some embodiments are illustrated in Figure 5A. As shown therein, the operations include repeating operations of transmitting (block 508) a slice of a fountain coded sequence through the plurality of antenna branches to the respective antenna elements, for each antenna branch of the plurality of antenna branch, selecting (block 516) the transmitted slice as a feedback signal through a return path, and determining (block 520) a signal quality of the feedback signal. At block 525, the systems, methods check to see if the last branch has been processed, and if not, operations return to block 516 to select the next feedback signal. The operations of blocks 516, 520 and 525 are repeated until the systems/methods determines at block 535 that the signal quality of the feedback signal for each antenna branch is greater than a threshold level. If so, the systems/methods perform (block 512) antenna calibration based on the feedback signal for each antenna branch.

Figure 5B:
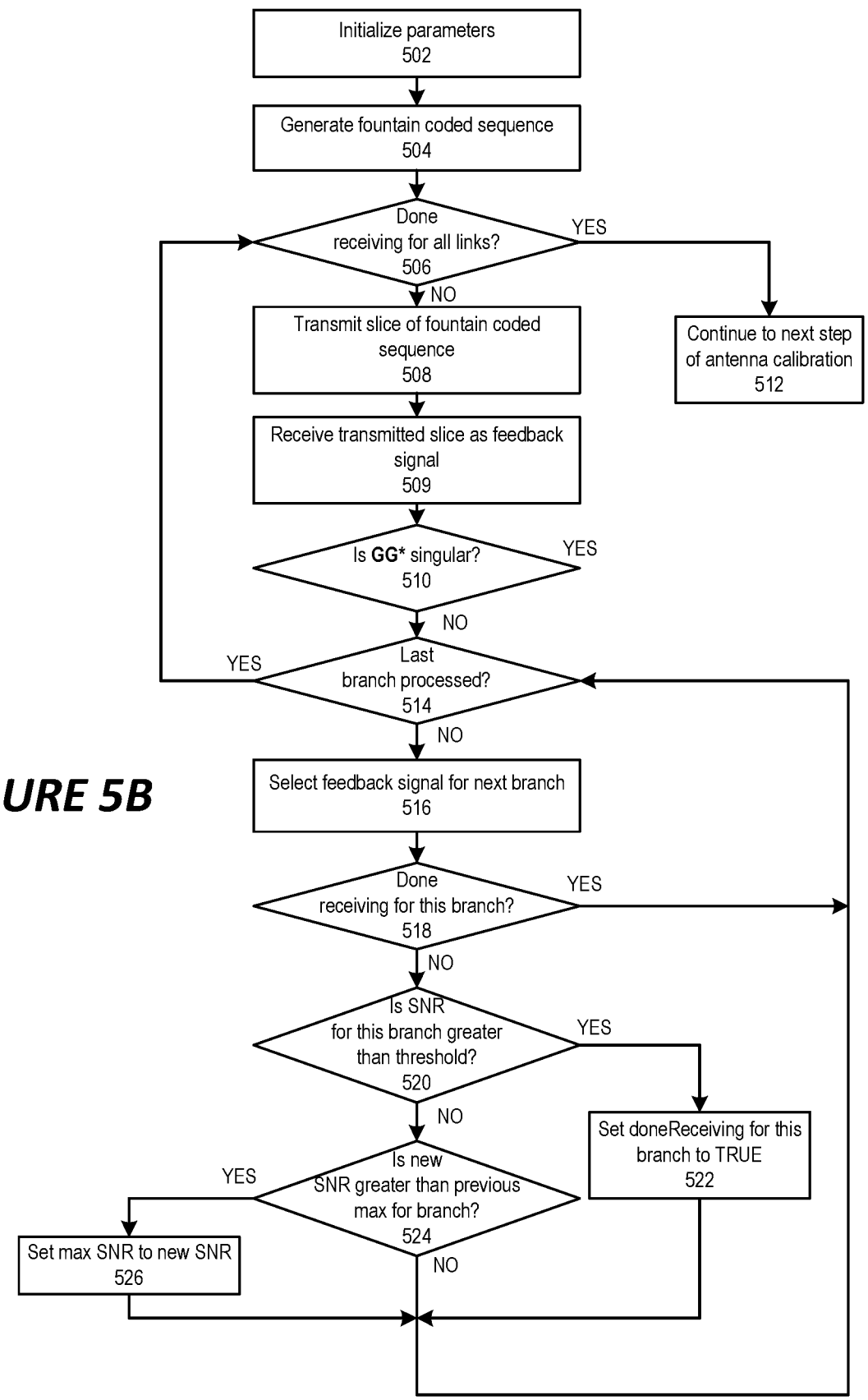

Operations of systems/methods according to some embodiments are illustrated in more detail in the flowchart of Figure 5B. Referring to Figure 5B, operations begin at block 502 with initialization of parameters, such as a target SNR threshold, $SNR_{thr}$, by the baseband processor 122. The method may also set a variable for each antenna branch to FALSE (e.g., doneReceiving$_n$) that indicates whether the system has received a calibration signal with high enough SNR to perform antenna calibration on the nth branch. The method may also initialize a variable for each branch (e.g., $SNR_{max,n}$) to represent the maximum SNR of the feedback signal received on the nth branch.

At block 504, the systems/methods generate a fountain coded sequence of length $N_{seq} \gg N$, where N denotes a number of antenna branches of the plurality of antenna branches. The order of operations of blocks 502 and 504 may be reversed.

After initialization and sequence generation, the operations check at block 506 to see if the baseband processor 122 has finished receiving a calibration signal with a sufficient SNR on each antenna branch. If so, the receiving operations terminate and the baseband processor 122 proceeds at block 512 to execute the next step of the antenna calibration process, for example, to estimate the phase and amplitude of each branch based on the received calibration signals.

If the baseband processor 122 has not completed receiving on all antenna branches, the operations proceed to execute a first loop including blocks 508, 509 and 510 in which the baseband processor 122 transmits a slice of the fountain coded sequence via the forward patch 212 (block 508) and receives the combined feedback signal via the return path 214 (block 509) until the baseband processor 122 determines at block 510 that the N×N matrix GG* is non-singular. Referring to FIG. 1B, the transmitted signals are combined at the combiner 145 and the combined feedback signal is fed back to the baseband processor 122 via return path 214.

Referring again to FIG. 5B, operations then proceed to block 514 where the baseband processor 122 processes each of the received signals. At block 514, the systems/methods determine if the last antenna branch has been processed, and if so, operations return to block 506 which again determines if the baseband processor 122 has finished receiving a calibration signal with a sufficient SNR on each antenna branch to continue with the AC algorithm.

If the last antenna branch has not yet been processed, operations proceed to block 516, where the baseband processor 122 selects the feedback signal for the next branch. The baseband processor 122 determines at block 518 if processing for the selected branch is already complete. For example, a calibration signal for the selected branch may have already exceeded the target SNR threshold ($SNR_{thr}$) based on receipt of an earlier slice of the calibration signal. If so, operations return to block 516 to select the next branch.

If processing for the selected branch is not yet complete, operations proceed to block 520, where the baseband processor 122 determines if the SNR for the selected branch is greater than the target SNR threshold $SNR_{thr}$. If so, the baseband processor 122 marks the processing of the selected branch as complete (e.g., by setting the variable doneReceiving$_n$ equal to TRUE for the selected branch), and operations return to block 514 to select the next branch.

If the baseband processor 122 determines at block 520 that the SNR of the selected branch has not yet exceeded the target SNR threshold, operations proceed to block 524 where the baseband processor 122 determines whether the new SNR for the branch is greater than the previously determined maximum SNR for the selected branch ($SNR_{max,n}$). If so, operations return to block 516 to select the next branch. Otherwise, the baseband processor 122 sets the maximum SNR for the selected branch ($SNR_{max,n}$) equal to the newly determined SNR for the branch at block 526, and operations return to block 514 to select the next branch.

The following examples are provided for purposes of explanation, although the inventive concepts are not limited thereto.

Example Method 1

In this example, the sequence for Branch 0 is generated by a Zadoff-Chu sequence of length N. The matrix is then replicated to length $N_{seq}$, where $N_{seq} \gg N$. In particular, the sequence for Branch 0 is generated by a Zadoff-Chu sequence of length N according to the formula shown in Eq. 11:

$$c_{0,i} = \exp\left(-j\frac{\pi u i(i+2q)}{N}\right), i = 0, \ldots, N-1 \quad [11]$$

where u and q denote the parameters of Zadoff-Chu sequence. u should be prime to N.

The sequences of the other branches are obtained by a circular shift of the sequence of Branch 0 according to Eq. 12:

$$c_{n,i} = c_{n-1, mod(i-1,N)}, n = 0, \ldots, N-1 \quad [12]$$

The sequences are extended to $N_{seq}$, $N_{seq} \gg N$, by repetition of existing sequences, i.e.:

$$c_{n,m} = c_{n, mod(m,N)}, m = 0, \ldots, N_{seq}-1 \quad [13]$$

Example Method 2

In this example, the sequences for all branches are generated by a Zadoff-Chu sequence of length $N_{seq}$ with different u, which can be expressed as shown in Eq. 14:

$$c_{n,m} = \exp\left(-j\frac{\pi u_n m(m+2q)}{N_{seq}}\right), m = 0, \ldots, N_{seq}-1 \quad [14]$$

where $u_n$ is the root of Zadoff-Chu sequence for branch n. $u_n$ should be prime to N. Since $N_{seq}$ is normally power of 2, a rule of thumb is choosing odd numbers for $u_n$.

Figure 6:
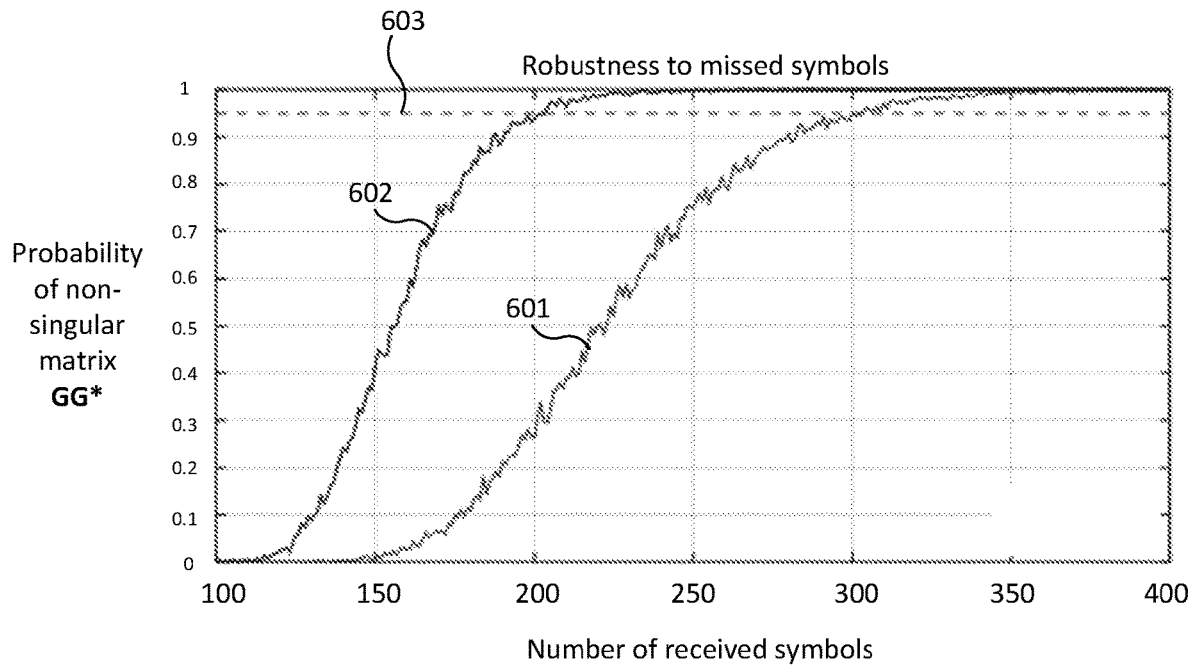
FIGS. 6 and 7 are graphs that illustrate simulation results according to some embodiments.

FIG. 6 compares simulation results of the two approaches described above for an AAS with 64 branches in a scenario in which some symbols are not received. The possibility of a non-singular matrix (y-axis) is used as an indicator that indicates the invertibility of GG*. The number of symbols is shown on the x-axis. The result of Example Method 1 is shown as curve 601, while the result of Example Method 2 is shown as curve 602.

As can be seen in FIG. 6, Example Method 2 has better a convergence rate than Example Method 1, because Method 1 uses replicas of the first N vectors in the remaining vectors. A threshold of p=0.05 is also shown as curve 603 in FIG. 6 as threshold. Method 2 reaches the threshold at around 200 symbols, while Method 1 reaches the threshold at around 300 symbols.

Figure 7:
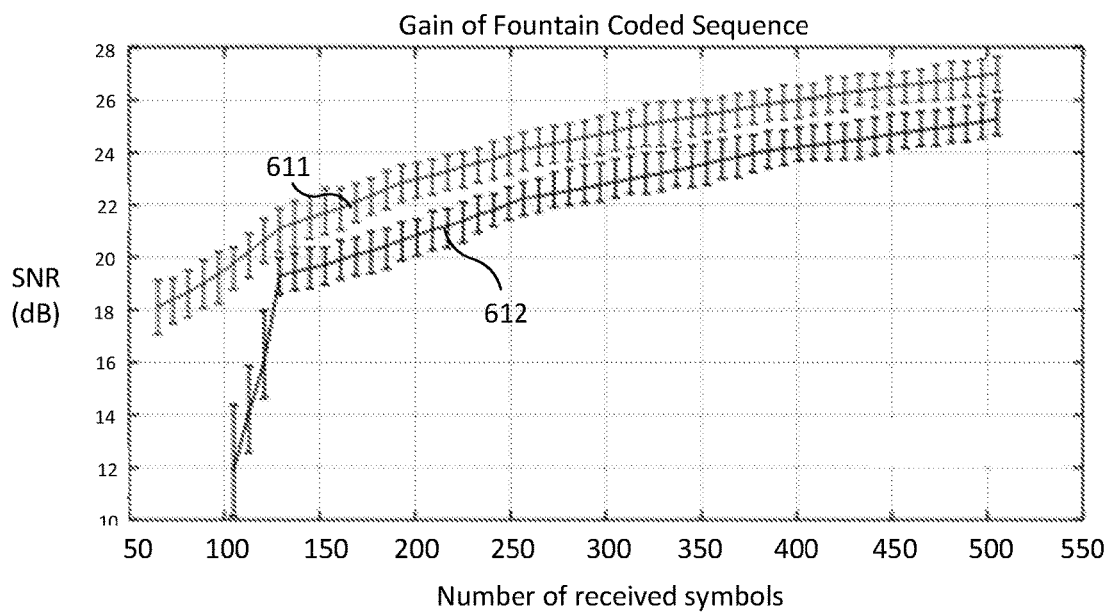

FIG. 7 compares simulation results of the SNR (y-axis) of the two methods as the number of received symbols (x-axis) increases. In this simulation, an AAS with 64 Branches and 0 dB SNR are assumed. This denotes a poor SNR condition and is used to confirm that the techniques described herein can handle a very large SNR dynamic range in a realistic environment. After first 64 symbols are received, Method 1 can be decoded. On the other hand, Method 2 needs a few more symbols to start decoding. In addition, Method 1 has better SNR than Method 2, because first 64 vectors of Method 1 are orthogonal to each other, which can provide more coding gain. In FIG. 7, the worst branch and the best branch, as well as the average branch are indicated for each data point. All branches can take advantage of coding gain and achieve good SNR. Whenever any branch exceeds the target SNR, it can be powered off to save energy. When all branches exceed the target SNR, the process can terminate and move forward to the next AC algorithm.

| | Definitions |
|---|---|
| AAS | Active Antenna System |
| AC | Antenna Calibration |
| AWGN | Additive White Gaussian Noise |
| CDM | Code Division Multiplexing |
| CP | Cyclic prefix |
| DL | Downlink |
| FDM | Frequency Division Multiplexing |
| FEC | Forward Error Correcting |
| UL | Uplink |
| MIMO | Multiple Input Multiple Output |
| MMSE | Minimum Mean Square Error |
| MU-MIMO | Multi-User MIMO |
| OFDM | Orthogonal Frequency Division Multiplexing |
| PAR | Peak to Average Ratio |
| RX | Receiver |
| SNR | Signal to Noise Ratio |
| TX | Transmitter |
| ZF | Zero Forcing |

Further definitions and embodiments are discussed below.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, constrained devices, processors, memory, networks, for example, generally referred to herein as a "computing device." With reference to the Figures, illustrative systems for implementing the described techniques include a general purpose computing device in the form of a computer, such as a mobile computing device or a fixed computing device. Components of the computer may include, but are not limited to, a processing unit including a processor circuit, such as a programmable microprocessor or microcontroller, a system memory, and a system bus that couples various system components including the system memory to the processing unit.

For non-constrained devices, the processor circuit may be a multi-core processor including two or more independent processing units. Each of the cores in the processor circuit may support multi-threading operations, i.e., may have the capability to execute multiple processes or threads concurrently. Additionally, the processor circuit may have an on-board memory cache. An example of a suitable multi-core, multithreaded processor circuit is an Intel Core i7-7920HQ processor, which has four cores that support eight threads each and has an 8 MB on-board cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof. For constrained devices, the processor may, for example, include an 8-bit or 16-bit microprocessor or microcontroller with or without built-in memory.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device may include a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processing unit. The system memory may store an operating system, application programs, other program modules, and program data.

The computing device may also include other removable/non-removable, volatile/nonvolatile computer storage media. By way of example only, the computer may include a hard disk drive reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface.

The drives and their associated computer storage media discussed above provide storage of computer readable instructions, data structures, program modules and other data for the computer. A user may enter commands and information into the computer through input devices such as a keyboard and pointing device, commonly referred to as a mouse, trackball or touch pad. Other input devices (not shown) may include a microphone, joystick, game pad, satellite dish, scanner, touchscreen, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and a printer, which may be connected through an output peripheral interface.

The computing device may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections include a local area network (LAN) connection and a wide area network (WAN) connection, but may also include other networks. Such networking environments are commonplace in offices, enterprise-wide computer networks, intranets and the Internet.

When used in a LAN networking environment, the computing device may be connected to the LAN through a network interface or adapter. When used in a WAN networking environment, the computing device may include a modem or other means for establishing communications over the WAN. The modem, which may be internal or external, may be connected to the system bus via the user input interface, or other appropriate mechanism.

Some embodiments of the present inventive concepts are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java or C++. However, the computer program code for carrying out operations of the present invention may also be written in conventional procedural programming languages, such as the "C" or JavaScript programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A method of calibrating an antenna array in a wireless network node including a plurality of antenna branches, each of the plurality of antenna branches including a respective antenna element, the method comprising:
   repeating operations of:
      transmitting a slice of a fountain coded sequence through the plurality of antenna branches to the respective antenna elements; and
      for each antenna branch of the plurality of antenna branches:
         selecting the transmitted slice as a feedback signal through a return path; and
         determining a signal quality of the feedback signal;
   until the signal quality of the feedback signal for each antenna branch is greater than a threshold level; and
   performing antenna calibration based on the feedback signal for each antenna branch.

2. The method of claim 1, wherein transmitting the slice of the fountain coded sequence comprises transmitting sequential slices of the fountain coded sequence until a matrix GG* formed by a generation matrix G is non-singular, where the generation matrix G comprises an N×M matrix comprising elements $c_{n,m}$, N denotes a number of antenna branches of the plurality of antenna branches, M denotes a number of received symbols of the fountain coded sequence, m denotes the mth symbol of the fountain coded sequence on an antenna branch n of the N number of branches of the plurality of antenna branches.

3. The method of claim 2, wherein the elements $c_{n,m}$ comprise a spreading code, and wherein generating the fountain coded sequence comprises spreading the at least one symbol using the spreading code $c_{n,m}$.

4. The method of claim 3, wherein generating the fountain coded sequence comprises generating a symbol of length N and repeating the symbol to obtain a sequence of length $N_{seq} > N$.

5. The method of claim 4, wherein generating the fountain coded sequence comprises generating the symbol for branch n according to the following equation:

$$c_{n,i} = \exp\left(-j\frac{\pi u i(i+2q)}{N}\right), i = 0, \ldots, N-1$$

where u and q denote parameters of a Zadoff-Chu sequence.

6. The method of claim 3, wherein generating the fountain coded sequence comprises generating a Zadoff-Chu sequence of length $N_{seq}$ according to the following equation:

$$c_{n,m} = \exp\left(-j\frac{\pi u_n m(m+2q)}{N_{seq}}\right), m = 0, \ldots, N_{seq} - 1$$

where $u_n$ is a root of the Zadoff-Chu sequence for branch n, and q denotes a parameter of the Zadoff-Chu sequence.

7. The method of claim 1, further comprising:
generating the fountain coded sequence;
slicing the fountain coded sequence to obtain the slice of the fountain coded sequence, wherein the slice of the fountain coded sequence comprises at least one symbol of the fountain coded sequence;
adding a cyclic prefix to the at least one symbol of the fountain coded sequence; and
inserting the slice of the fountain coded symbol into a downlink signal for transmission.

8. The method of claim 1, wherein determining the signal quality of the feedback signal comprises determining a signal to noise ratio, SNR, of the feedback signal.

9. The method of claim 8, wherein determining the signal to noise ratio of the feedback signal comprises performing blind SNR estimation.

10. The method of claim 9, wherein performing blind estimation comprises determining SNR according to the following formula:

$$\rho = \frac{\sqrt{2M_2^2 - M_4}}{M_2 - \sqrt{2M_2^2 - M_4}}$$

where ρ is the SNR, $$M_2 = \frac{1}{N_{fft}}\sum_{j=0}^{N_{fft}-1}|\tilde{s}_n(j)|^2, M_4 = \frac{1}{N_{fft}}\sum_{j=0}^{N_{fft}-1}|\tilde{s}_n(j)|^4,$$

$\tilde{s}_n(j)$ is the jth element of $\tilde{s}_n$, $\tilde{s}_n$ is an estimated value of the symbol of the fountain coded sequence at the nth antenna branch, and $N_{fft}$ is a size of a Fast Fourier Transform matrix used to generate the symbol.

11. The method of claim 1, further comprising estimating the fountain coded sequence from the feedback signal using a zero forcing receiver or a minimum mean square error receiver.

12. The method of claim 11, wherein estimating the fountain coded sequence from the feedback signal using a zero forcing receiver comprises estimating the fountain coded sequence according to the formula:

$$[\tilde{s}_0, \tilde{s}_1, \ldots, \tilde{s}_{N-1}] = [r_0, r_1, \ldots, r_m]G^*(GG^*)^{-1}$$

where $r_m$ denotes an mth element of the received signal, G denotes a generation matrix that comprises a matrix comprising elements $c_{n,m}$, where N denotes a number of antenna branches of the plurality of antenna branches, M denotes a number of received symbols of the fountain coded sequence, m denotes the mth symbol of the fountain coded sequence on branch n of the N number of branches of the plurality of antenna branches, and $\tilde{s}_n$ denotes an estimated value of the mth symbol of the fountain coded sequence on branch n.

13. The method of claim 11, wherein estimating the fountain coded sequence from the feedback signal using a minimum mean square error receiver comprises estimating the fountain coded sequence according to the formula:

$$[\tilde{s}_0, \tilde{s}_1, \ldots, \tilde{s}_{N-1}] = [r_0, r_1, \ldots, r_m]G^*(GG^* + 1/\rho)^{-1}$$

where $r_m$ denotes an mth element of the received signal, G denotes a generation matrix that comprises an N×M matrix comprising elements $c_{n,m}$, N denotes a number of antenna branches of the plurality of antenna branches, M denotes a number of received symbols of the fountain coded sequence, m denotes the mth symbol of the fountain coded sequence on branch n of the N number of branches of the plurality of antenna branches, $\tilde{s}_n$ denotes an estimated value of the mth symbol of the fountain coded sequence on branch n, and ρ is signal-to-noise ratio (SNR).

14. The method of claim 1, wherein the fountain coded sequence comprises a plurality of symbols generated by orthogonal frequency division multiplexing.

15. A network node, comprising:
a processor circuitry;
a wireless transceiver coupled to the processor circuit; and
a memory coupled to the processor circuit, the memory comprising machine readable program instructions that, when executed by the processor circuit, cause the network node to perform operations comprising operations according to claim 1.

16. A computer program comprising program code to be executed by processing circuitry of a network node configured to operate in a communication network, whereby execution of the program code causes the network node to perform operations according to claim 1.

17. A computer program product comprising a non-transitory storage medium including program code to be executed by processing circuitry of a network node configured to operate in a communication network, whereby execution of the program code causes the network node to perform operations according to claim 1.

18. A network node, comprising:
a processor circuitry;
a wireless transceiver coupled to the processor circuit; and
a memory coupled to the processor circuit, the memory comprising machine readable program instructions that, when executed by the processor circuit, cause the network node to perform operations comprising:
repeating operations of:
transmitting a slice of a fountain coded sequence through the plurality of antenna branches to the respective antenna elements; and
for each antenna branch of the plurality of antenna branches:
selecting the transmitted slice as a feedback signal through a return path; and
determining a signal quality of the feedback signal;
until the signal quality of the feedback signal for each antenna branch is greater than a threshold level; and performing antenna calibration based on the feedback signal for each antenna branch.

19. A computer program comprising program code to be executed by processing circuitry of a network node configured to operate in a communication network, whereby execution of the program code causes the network node to perform operations comprising:
    repeating operations of:
        transmitting a slice of a fountain coded sequence through the plurality of antenna branches to the respective antenna elements; and
        for each antenna branch of the plurality of antenna branches:
            selecting the transmitted slice as a feedback signal through a return path; and
            determining a signal quality of the feedback signal;
    until the signal quality of the feedback signal for each antenna branch is greater than a threshold level; and
    performing antenna calibration based on the feedback signal for each antenna branch.

20. A computer program product comprising a non-transitory storage medium including program code to be executed by processing circuitry of a network node configured to operate in a communication network, whereby execution of the program code causes the network node to perform operations comprising:
    repeating operations of:
        transmitting a slice of a fountain coded sequence through the plurality of antenna branches to the respective antenna elements; and
        for each antenna branch of the plurality of antenna branches:
            selecting the transmitted slice as a feedback signal through a return path; and
            determining a signal quality of the feedback signal;
    until the signal quality of the feedback signal for each antenna branch is greater than a threshold level; and
    performing antenna calibration based on the feedback signal for each antenna branch.

\* \* \* \* \*